Patented June 6, 1950

UNITED STATES PATENT OFFICE 2,510,738

OIL SOLUBLE TRI-(SUBSTITUTED-MERCAPTO)-ANTIMONOUS ACIDS

Le Roy W. Clemence, Highland Park, and Marlin T. Leffler, Lake Bluff, Ill., assignors to Abbott Laboratories, North Chicago, Ill., a corporation of Illinois No Drawing. Application January 23, 1947, Serial No. 723,907

9 Claims. (Cl. 260—446)

The present invention relates to oil soluble antimonials and more specifically to tri-(substituted-mercapto)-antimonous acids. The compounds of the present invention may be illustrated by the following general formula:

wherein R is an organic radical containing at least eight carbon-atoms. In the preferred compounds of the present invention R is a hydrocarbon radical containing 8 to 18 carbon atoms.

We have discovered that antimonial compounds characterized by the above formula are active chemotherapeutic agents. They are effective, for example, in the treatment of certain tropical parasitic diseases, and particularly in the treatment of schistosomiasis.

We have discovered that the compounds of the present invention have the property of being soluble in oils such as the fatty oils. We have also discovered that administration of the compounds is very practical in oil mediums of this type.

The compounds of this invention may be resolved into three groupings. In the first group are the tri-(n-alkyl-mercapto)-S-antimonous acids. These alkyl groups have from eight to eighteen carbon atoms. The second grouping is the tri-(β-cyclic-ethyl mercapto)-S-antimonous acids. Group three has substituents similar to group two except that an alkyl chain and ether linkages exist in addition to the cyclic group.

The preparation of the compounds of the present invention may be accomplished by a novel method we have discovered to be satisfactory. In this general method one mole proportion of antimony trichloride is dissolved in an inert solvent by warming. This solution is filtered into an equal quantity of an inert solvent miscible with the first solvent and containing three-mole proportions of the suitable R-mercaptan where the R group represents an organic radical as indicated above. The resulting solution is distilled under vacuum until the solvents have been removed. The residual oil which smells slightly of hydrochloric acid is placed in a vacuum dryer over solid sodium hydroxide until all of the hydrochloric acid has been removed. The general reaction of this process may be expressed as follows:

$$3RSH + SbCl_3 \rightarrow Sb(-S-R)_3 + 3HCl\uparrow$$

The compounds of the present invention have no exact physical constants such as melting point, boiling point, etc. Antimony analyses, however, demonstrate the compounds to be substantially pure.

EXAMPLE I

Tri(n-dodecyl-mercapto)-S-antimonous acid $$(n-C_{12}H_{25}S-)_3Sb$$

About 7.61 gms. (0.033 mole) of antimonous trichloride is dissolved in 75 cc. of chloroform by warming. This solution is filtered into a 75 cc. solution of chloroform containing 20.2 gms. (0.1 mole) of n-dodecyl-mercaptan. The resulting solution is distilled under vacuum until the chloroform has been removed.

The residual oil, which smells slightly of hydrochloric acid formed during the reaction, is placed in a vacuum dryer over solid sodium hydroxide until all of the hydrochloric acid has been removed. The product obtained is a clear, pale yellow oil which becomes a waxy solid on standing.

EXAMPLE II

Tri[β(napthyl-1)-ethylmercapto]-S-antimonous acid

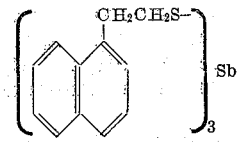

About 7.61 gms. (0.033 mole) of antimonous trichloride is dissolved in 75 cc. of chloroform by warming. This solution is filtered into a 50 cc. of solution of chloroform containing 18.8 gms. (0.1 mole) of β-(napthyl-1)-ethyl mercaptan. The resulting solution is distilled under vacuum until the chloroform has been removed.

The residual oil, which smells slightly of hydrochloric acid formed during the reaction, is placed in a vacuum dryer over solid sodium hydroxide until all of the hydrochloric acid has been removed. The product obtained is a clear, pale yellow oil which becomes a waxy solid on standing.

EXAMPLE III

Tri[β(cyclohexyl)-ethylmercapto]-S-antimonous acid

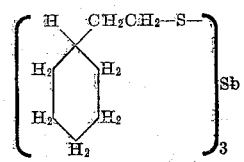

By substituting in either Examples I or II, 14.4 gms. (0.1 mole) of β(cyclohexyl)-ethyl mercaptan the above compound may be obtained. This product is isolated just as the products of Examples I and II are.

Among other representative compounds which we have prepared by the above process by substitution of the proper mercaptan are listed below:

*Tri-(R-mercapto)-S-antimonous acids*

| R= | Formula | Antimony Content | |
|---|---|---|---|
| | | Theoretical | Found |
| | | *Per cent* | *Per cent* |
| n-Octyl— | (n—$C_8H_{17}S$—)$_3$Sb | 21.9 | 20.8 |
| n-Decyl— | (n—$C_{10}H_{21}S$—)$_3$Sb | 19.0 | 19.7 |
| n-Undecyl— | (n—$C_{11}H_{23}S$—)$_3$Sb | 17.8 | 17.0 |
| n-Tetradecyl— | (n—$C_{14}H_{29}S$—)$_3$Sb | 15.0 | 14.3 |
| n-Hexadecyl— | (n—$C_{16}H_{33}S$—)$_3$Sb | 14.4 | 13.6 |
| n-Octadecyl— | (n—$C_{18}H_{37}S$—)$_3$Sb | 12.4 | 11.2 |
| β-Phenylethyl— | ($C_6H_5CH_2$—$CH_2$—S—)$_3$Sb | 22.8 | 20.9 |
| β-(p-Diisobutyl phenoxy-ethoxy)-ethyl— | 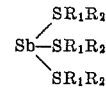 | 11.6 | 11.6 |

The mercaptan used in the last compound of the table, namely, β - (p - diisobutyl phenoxy-ethoxy)-ethylmercaptan is prepared by converting the corresponding alcohol to the halide; reacting this with isothiourea and hydrolyzing this to the above mentioned mercaptan.

The compounds of the present invention may be incorporated into pharmaceutical vehicles, and since they are oil soluble, they may be effectively administered in oil solutions. The solutions may be prepared by dissolving the compounds in fatty or vegetable oils such as peanut, olive or almond oil, in desired concentrations. Concentrations of about 10 per cent have been found to be satisfactory.

Others may readily adopt the invention for use under varying conditions of service, by employing one or more of the novel features disclosed, or equivalents thereof. As at present advised with respect to the apparent scope of our invention, we desire to claim the following subject matter.

We claim:
1. Tri-(n-alkyl-mercapto)-S-antimonous acids with the following formula:

$$Sb(—S—R)_3$$

wherein R is a normal alkyl group containing from eight to eighteen carbon atoms.

2. The compound tri-(n-octyl-mercapto)-S-antimonous acid with the following formula:

$$(n—C_8H_{17}—S—)_3Sb$$

3. The compound tri-(n-dodecyl-mercapto)-S-antimonous acid with the following formula:

$$(n—C_{12}—H_{25}—S—)_3Sb$$

4. The compound tri-(n-hexadecyl-mercapto)-S-antimonous acid with the following formula:

$$(n—C_{16}H_{33}—S—)_3Sb$$

5. In the process of producing oil soluble tri-(substituted mercapto-) S-antimonous acids of claim 3, the improvement which consists in adding antimony trichloride in the proportion of one-mole unit dissolved in an inert organic solvent to a three-mole unit quantity of a mercaptan contained in an inert organic solvent miscible with the first mentioned solvent; and then removing the solvents by vacuum distillation.

6. Oil soluble tri(alkyl-mercapto)-S-antimonous acids with the following formula $$Sb(—S—R_1)_3$$

wherein $R_1$ is an alkyl group having at least eight carbon atoms.

7. Oil soluble tri-(substituted-mercapto)-S-antimonous acids represented by the following formula:

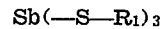

wherein $R_1$ represents an alkylene group characterized by a $CH_2$—$CH_2$ group attached to the sulfur atom and $R_2$ represents a hydrocarbon radical, and $R_1$ and $R_2$ together contain from 8 to 18 carbon atoms.

8. The compound, tri-(n-decyl-mercapto)-S-antimonous acid with the following formula:

$$(n—C_{10}H_{21}S—)_3Sb$$

9. The compound, tri-(n-tetradecyl-mercapto)-S-antimonous acid with the following formula:

$$(n—C_{14}H_{29}S—)_3Sb$$

LE ROY W. CLEMENCE.
MARLIN T. LEFFLER.

REFERENCES CITED

The following references are of record in the file of this patent:

UNITED STATES PATENTS

| Number | Name | Date |
|---|---|---|
| 1,561,535 | Hahl | Nov. 17, 1925 |
| 2,060,181 | Delepine et al. | Nov. 10, 1936 |
| 2,066,742 | Schmidt | Jan. 5, 1937 |
| 2,078,856 | Kirstahler | Apr. 27, 1937 |
| 2,116,182 | Baur | May 3, 1938 |
| 2,130,321 | Kharasch | Sept. 13, 1938 |
| 2,137,927 | Sturm et al. | Nov. 22, 1938 |
| 2,180,262 | Sturm et al. | Nov. 14, 1939 |
| 2,226,530 | Brown et al. | Dec. 31, 1940 |
| 2,229,992 | Schmidt | Jan. 28, 1941 |
| 2,250,553 | Ruskin | July 29, 1941 |
| 2,374,983 | De Simo | May 1, 1945 |
| 2,402,640 | Lazier | Jan. 25, 1946 |

FOREIGN PATENTS

| Number | Country | Date |
|---|---|---|
| 169,577 | Switzerland | Aug. 16, 1934 |

Certificate of Correction

Patent No. 2,510,738                                                                                  June 6, 1950

LE ROY W. CLEMENCE ET AL.

It is hereby certified that error appears in the printed specification of the above numbered patent requiring correction as follows:

Column 3, line 69, for the claim reference numeral "3" read 7;

and that the said Letters Patent should be read with this correction therein that the same may conform to the record of the case in the Patent Office.

Signed and sealed this 19th day of September, A. D. 1950.

[SEAL]

THOMAS F. MURPHY,
*Assistant Commissioner of Patents.*